(12) United States Patent
Nakahara et al.

(10) Patent No.: US 6,170,621 B1
(45) Date of Patent: Jan. 9, 2001

(54) VEHICULAR DAMPER WITH VEHICLE HEIGHT ADJUSTING FUNCTION

(75) Inventors: Kiyoshi Nakahara; Yukio Hayakawa, both of Tochigi-ken (JP)

(73) Assignee: Honda Giken Kogyo Kabushiki Kaisha, Tokyo (JP)

( * ) Notice: Under 35 U.S.C. 154(b), the term of this patent shall be extended for 0 days.

(21) Appl. No.: 09/166,117

(22) Filed: Oct. 5, 1998

(30) Foreign Application Priority Data

Oct. 8, 1997 (JP) .................................................. 9-275818
Oct. 8, 1997 (JP) .................................................. 9-275819
Oct. 8, 1997 (JP) .................................................. 9-275820

(51) Int. Cl.$^7$ .......................................................... F16F 9/42
(52) U.S. Cl. ............................................................ 188/274
(58) Field of Search ................................... 267/118, 121, 267/DIG. 1, 64.16; 188/274, 276

(56) References Cited

U.S. PATENT DOCUMENTS 3,067,841 * 12/1962 Kendall .................................. 188/274
5,601,164 * 2/1997 Ohsaki .................................. 188/274
5,927,071 7/1999 Asanuma et al. ...................... 60/396

FOREIGN PATENT DOCUMENTS 07308661    11/1995   (JP) .

* cited by examiner

Primary Examiner—Christopher P. Schwartz
Assistant Examiner—C. T. Bartz
(74) Attorney, Agent, or Firm—Armstrong, Westerman, Hattori, McLeland & Naughton

(57) ABSTRACT

On an outside of a damper main body, there is provided a case which is movable up and down and which is connected to a damper rod. Between the damper main body and the case, there is formed a pressure chamber which is filled with a pressure medium which changes its state between a gaseous state and a liquid state. A heating chamber to flow therethrough a heating medium which is heated by the heat of the driving source or the like of a vehicle is disposed in a manner to contact a liquid sump portion of the pressure chamber. The pressure medium is heated and evaporated by the heat of the heating medium to thereby increase the internal pressure of the pressure chamber. The case is thus pushed upward and the damper rod is moved up, whereby the vehicle height increases.

7 Claims, 2 Drawing Sheets

VEHICULAR DAMPER WITH VEHICLE HEIGHT ADJUSTING FUNCTION

BACKGROUND OF THE INVENTION

1. Field of the Invention

The present invention relates to a vehicular damper with a vehicle height adjusting function which is applied to a vehicle such as a motor vehicle. In this specification, the term "vehicular damper" means a damper for use in a vehicle.

2. Description of the Related Art

A vehicular damper is provided with a damper main body, and a damper rod which is inserted into the damper main body so as to be movable up and down. One of the damper main body and the damper rod is connected to an unsprung member, and the other thereof is connected to a vehicle body so that a damping force against the vibrations of the unsprung member can be obtained.

In case a function of adjusting the vehicle height (also called a vehicle height adjusting function) is added to the damper, the following arrangement is employed. Namely, a cylinder for adjusting the vehicle height is interposed between the vehicle body and the damper. A pressure fluid from a pressure source is supplied to the cylinder, whereby the vehicle height is adjusted. As this pressure source, a pump to be driven by an engine of the vehicle is normally used. In this arrangement, however, the energy consumption increases and the specific fuel consumption becomes poor. As a solution, in order to enable to supply the pressure fluid without consuming the energy of the engine, there is proposed in Japanese Published Unexamined Patent Application No. 150615/1997 an art in which a heat-pressure conversion type of pressure source utilizing the waste heat of an engine is used.

This pressure source is provided with: a pressure chamber hermetically containing therein a pressure medium which changes its state between a liquid state and a gaseous state; a heating chamber for passing therethrough a heating medium which is heated by the heat generated by a driving source of the vehicle; and a fluid chamber which is contained in the pressure chamber so as to be expanded and contracted. By the rise in the internal pressure in the pressure chamber as a consequence of evaporation of the pressure medium, the pressure chamber is compressed. The pressurizing fluid is thus supplied from the fluid chamber to the vehicle height adjusting cylinder.

The above-described heat-pressure converting type of pressure source must, like the pressure source to be driven by the engine, be mounted on the vehicle body separately from the damper. Therefore, it is troublesome to mount it on the vehicle body.

In view of the above-described point, the present invention has an object of assembling the pressure source integrally with the damper to thereby improve the ease within which the damper can be mounted on the vehicle body.

SUMMARY OF THE INVENTION

In order to attain the above and other objects, the present invention is a vehicular damper with a vehicle height adjusting function, having a damper main body and a damper rod which is vertically movably inserted into the damper main body, the damper comprising: a cylindrical case which is vertically movably provided on an outside of the damper main body and which is connected to the damper rod; a pressure chamber which is formed between the damper main body and the case and which is filled with a pressure medium which changes its state between a gaseous state and a liquid state; and a heating chamber which heats and evaporates the heating medium inside the pressure chamber by causing a heated heating medium to flow through the heating chamber.

When the heating medium flows through the heating chamber, the pressure medium is heated and evaporated whereby the internal pressure inside the pressure chamber increases. As a result, the case, i.e., the damper rod is pushed by the internal pressure in the pressure chamber to thereby move in the direction of extending relative to the damper main body. This brings about an increased vehicle height. The pressure source which is made up of the pressure chamber and the heating chamber is integrally assembled into the damper and, therefore, the mounting it to the vehicle body becomes easy.

In the above-described arrangement, when the ambient temperature changes, the internal pressure in the pressure chamber changes. As a result, the vehicle height is likely to vary depending on the ambient temperature. As a solution, it is preferable to provide a cover disposed on an outside of the case, the cover being arranged to move up and down depending on the ambient temperature.

When the cover moves up and down relative to the case, the area of the portion which is exposed, out of covering by the cover, to the outside varies, and the amount of heat dissipated from the exposed portion varies. Therefore, by moving the cover such that the area of the exposed portion increases with an increase in the ambient temperature, the increase in the input heat to the pressure chamber as a result of the increase in the ambient temperature is offset by the increase in the amount of heat of dissipation. As a result, there can be obtained a temperature compensation function to restrain the change in the internal pressure of the pressure chamber due to the ambient temperature, i.e., to restrain the change in the vehicle height.

It may also be arranged that the cover is moved up and down by the moving mechanism which is driven by a signal of a temperature sensor which detects the ambient temperature. However, if the cover is supported by a thermally deformable supporting member such as bimetal or the like to move it up and down, the temperature sensor and the moving mechanism become needless. This arrangement is therefore advantageous in seeking for a cost reduction.

Further, if an outer peripheral surface of the case is covered by a thermally insulating material, and a plurality of cooling fins are formed in that part of a vertically elongated outer peripheral surface of the case which is free from covering by the thermally insulating material such that, by the movement of the cover due to an increase in the ambient temperature, the cooling fins are exposed outside, the damper is less likely to be subject to the effect of the ambient temperature. Further, the degree of change in the amount of heat dissipation relative to the moving distance of the cover becomes large. As a result, the stroke of movement of the cover can be minimized. This arrangement is advantageous in seeking for a miniaturization of the damper.

In a damper of the type in which the damper rod is inserted into the damper main body from the upper side, the case, i.e., the damper rod which is connected to the case, is pushed upward relative to the damper main body by the internal pressure of the pressure chamber, resulting in an increases the vehicle height. In this case, if the heating chamber is formed to extend in a vertical direction along a peripheral wall portion of the damper main body such that a vertical overlapping length between the pressure chamber and the heating chamber decreases as a result of an upward movement of the case relative to the damper main body, accompanied by the upward movement of the case, the amount of heat input from the heating chamber to the pressure chamber decreases. As a result, when the vehicle height has reached a predetermined height, the internal pressure in the pressure chamber and the load from the upper side are balanced with each other, and the vehicle height is maintained at that height. In this manner, a levelling function can be obtained without using a special control mechanism. Further, if heating chamber is divided into at least two chambers, and if the heating chamber is arranged to be switchable between a state in which the heating medium flows only into a lower chamber and a state in which the heating medium flows also into an upper chamber, the amount of heat input into the pressure chamber can be varied by the switching. The vehicle height can advantageously be switchable into a plurality of stages.

BRIEF DESCRIPTION OF THE DRAWINGS

The above and other objects and the attendant advantages of the present invention will become readily apparent by reference to the following detailed description when considered in conjunction with the accompanying drawings wherein.

DETAILED DESCRIPTION OF PREFERRED EMBODIMENTS

Figure 1:
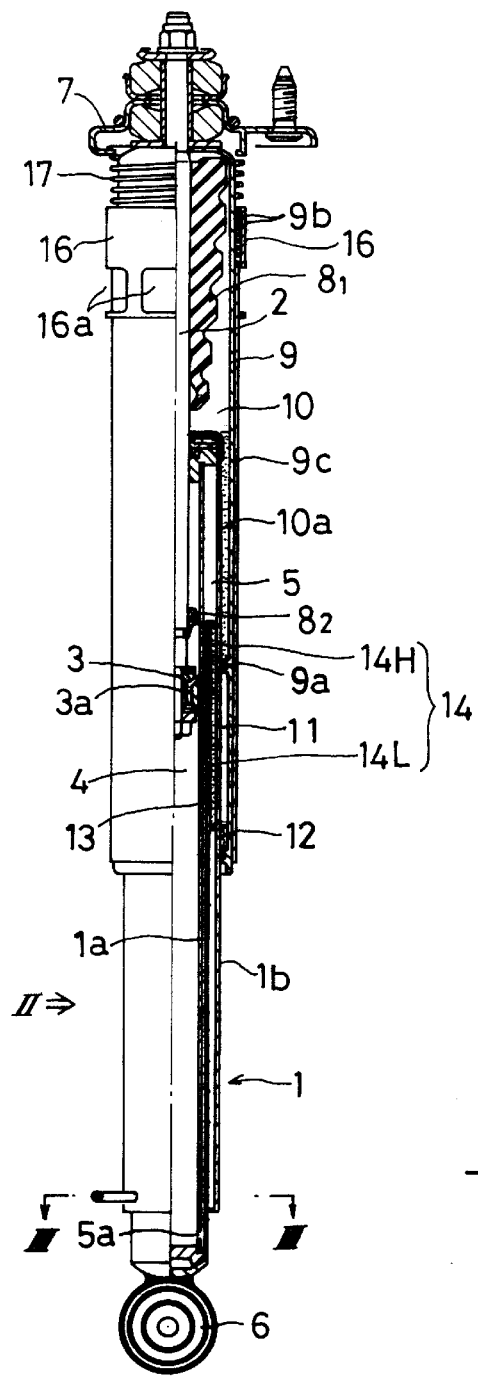
FIG. 1 is a front view, half shown in section, of a first embodiment of the damper according to the present invention.

With reference to FIG. 1, reference numeral 1 denotes a damper main body which is constituted by an inner tube 1a and an outer tube 1b. A damper rod 2 is inserted into the damper main body 1 so as to be vertically movable. To a lower end of the damper rod 2, there is attached a damper piston 3 having an orifice 3a. The inside of the inner tube 1a is formed into an oil chamber 4 into which the damper piston 3 is inserted. The space between the inner tube 1a and the outer tube 1b is formed into a reserve chamber 5 which is in communication with the oil chamber 4 through an orifice 5a at a lower end of the inner tube 1a, whereby a twin tube type of hydraulic damper is constituted. The damper main body 1 is connected to an unsprung member via a bush 6 which is attached to a lower end of the damper main body 1. The damper rod 2 is connected to the vehicle body via a bracket 7 which is attached to an upper end of the damper rod 2. It is thus so arranged that a damping force against the vertical vibrations of the unsprung member can be obtained. Further, a bump stop rubber 81 is provided on the lower side of the bracket 7, and a rebound stop rubber 82 is provided at that portion of the damper rod 2 which is inserted into the damper main body 1. It is thus so arranged that a stopper function can be obtained against the bumping motion (contraction motion) and the rebounding motion (extension motion) of the damper.

On an outside of the damper main body 1 there is provided, in a vertically movable manner, a cylindrical case 9 which is connected to the damper rod 2. Between the case 9 and the damper main body 1, there is formed a pressure chamber 10 which is filled with a pressure medium having of low boiling point such as Freon 134a or the like. In a vertically intermediate portion of that section of the case 9 which lies opposite the outer peripheral surface of the damper main body 1, there is provided a partition 9a. The clearance between the outer peripheral surface of the damper main body 1 and the inner peripheral surface of the case 9 is defined by the partition 9a into an upper liquid sump portion 10a in which the liquid phase pressure medium inside the pressure chamber 10 stays and a lower thermally insulating air layer portion 11. Further, at a lower end of the thermally insulating air layer portion 11, there is provided a grease sump portion 12.

On a peripheral surface of the damper main body 1, there is formed a vertically elongated heating chamber 14 by means of a jacket 13 which is provided on an inner peripheral surface of the outer tube 1b. The heating medium which is heated by the heat of the driving source of the vehicle is passed (or caused to flow) through the heating chamber 14. The liquid phase pressure medium which is accumulated in the liquid sump portion 10a of the pressure chamber 10 is thus heated and evaporated. As the heating medium there can be used a cooling medium such as water, oil or the like which cools the engine or an electric motor in an electric vehicle, or a medium such as water or the like which is heated by a heat exchanger which is disposed in a circulation circuit of the cooling medium.

Figure 2:
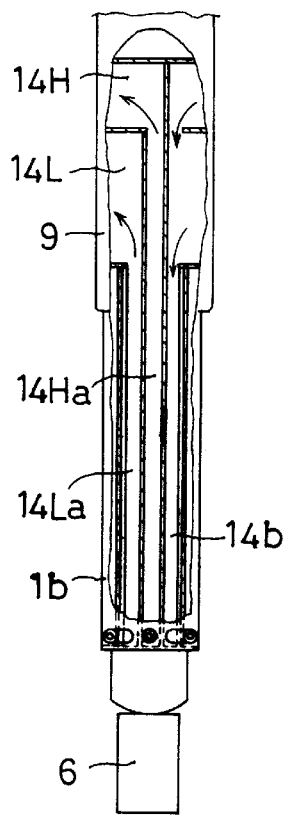
FIG. 2 is a side view, partly shown in section, as seen in the direction of an arrow II in FIG. 1.
Figure 3:
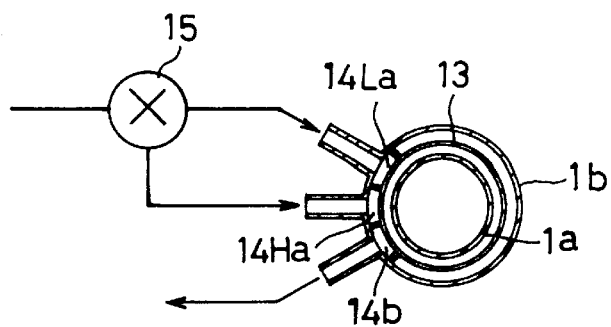
FIG. 3 is a sectional view taken along the line III—III in FIG. 1.

In this embodiment, the heating chamber 14 is divided into vertically disposed two chambers, i.e., an upper chamber 14H and a lower chamber 14L. As shown in FIGS. 2 and 3, there are formed an inlet channel 14La which is in communication with the lower chamber 14L, an inlet channel 14Ha which is in communication with the upper chamber 14H, and an outlet channel 14b which discharges the heating medium by combining it from both the upper chamber 14H and the lower chamber 14L. By means of a remote controlled changeover valve 15, the heating chamber 14 can thus be switched between a state in which the heating medium cannot flow into either of the upper chamber 14H and the lower chamber 14L, a state in which the heating medium can flow only into the lower chamber 14L, and a state in which the heating medium can flow into both the upper chamber 14H and the lower chamber 14L.

On an upper portion of the outer peripheral surface of the case 9, there are formed a plurality of cooling fins 9b. A lower portion of the case 9 which is free from the cooling fins 9b is coated with a thermally insulating material 9c. On an outside of the case 9 there is provided a cover 16 which covers the portion at which the cooling fins 9b are formed. The cover 16 is supported by a supporting member 17 which is made up of a bimetal of a coil spring shape which is mounted on the bracket 7. The cover 16 is thus arranged to be moved up as a result of an increase in the ambient temperature. As a result, the cooling fins 9b are exposed to the outside through windows 16a which are formed at a lower portion of the cover 16.

An explanation will now be made about the operation of the above-described embodiment.

When the heating medium is caused to flow through the heating chamber 14, the liquid phase pressure medium which stays in the liquid sump portion 10a is heated and evaporated by the heat from the heating chamber 14. The internal pressure inside the pressure chamber 10 thus increases and the case 9 is pushed up relative to the damper main body 1. As a result, the damper rod 2 moves up and the vehicle height increases.

Here, if the case 9 moves up, the vertical length of overlapping between the liquid sump portion 10*a* and the heating chamber 14 decreases and, consequently, the amount of heat input from the heating chamber 14 to the pressure chamber 10 decreases. Therefore, when the vehicle height has reached a predetermined height, the load from the upper side and the internal pressure inside the pressure chamber 10 balance with each other. The vehicle height is thus maintained at that height. In this manner, there can be obtained a function of maintaining the vehicle height to a predetermined height without using a special control function.

In a state in which the heating medium is caused to flow only to the lower chamber 14L of the heating chamber 14, the vehicle height becomes relatively low. On the other hand, when the heating medium is caused to flow also through the upper chamber 14H, the amount of heat input from the heating chamber 14 into the pressure chamber 10 increases, whereby the internal pressure inside the pressure chamber 10 increases and the vehicle height becomes high.

When the ambient temperature increases, there is a possibility that the internal pressure in the pressure chamber 10 increases and the vehicle height increases. In the above-described embodiment, however, when the ambient temperature increases, the cover 16 moves up whereby the cooling fins 9*b* are exposed to the outside. Therefore, the increase in the amount of heat input into the pressure chamber 10 due to the increase in the ambient temperature is canceled or offset by the increase in the amount of heat radiation from the cooling fins 9*b*. There can thus be obtained a function of compensating for the temperature to restrain the change in the internal pressure of the pressure chamber 10, i.e., the change in the vehicle height due to the ambient temperature.

Figure 4:
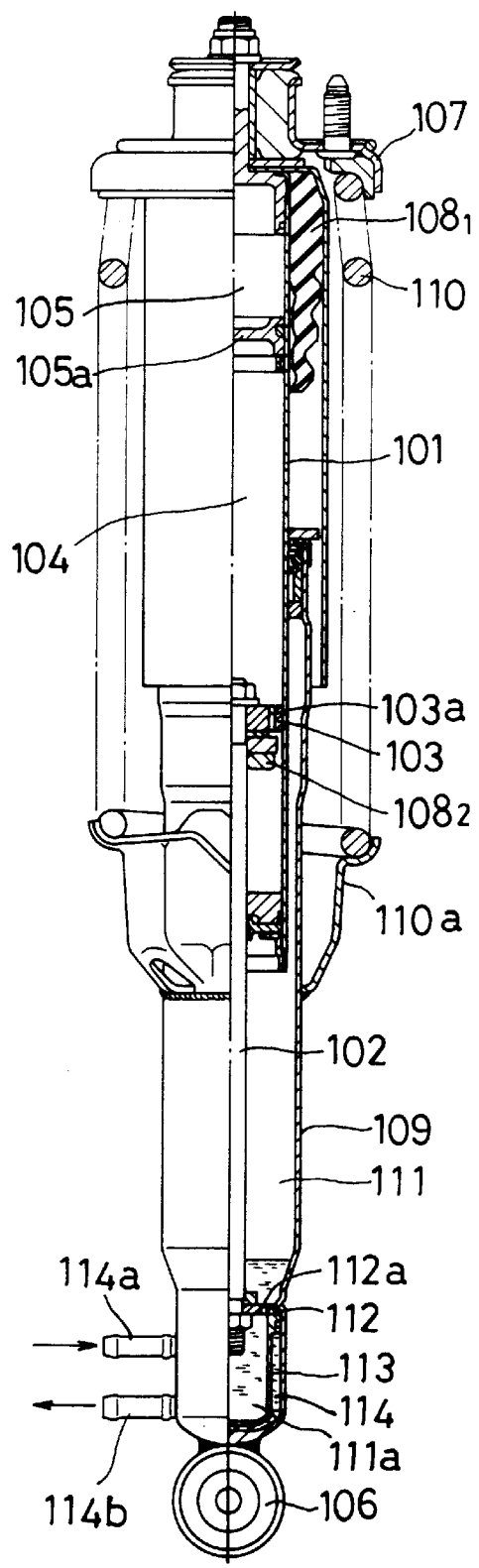
FIG. 4 is a front view, half shown in section, of a second embodiment of the damper according to the present invention.

FIG. 4 shows another embodiment of the present invention. In this embodiment, the damper is constituted into an inverted mono-tube type of hydraulic damper having the following construction. Namely, a damper rod 102 is inserted from underneath into a damper main body 101 which is made of a single tube. Inside the damper main body 101, there are formed: an oil chamber 104 into which is inserted a damper piston 103 which is attached to an upper end of the damper rod 102 and which has an orifice 103*a*; and an upper gas chamber 105 which is partitioned by a free piston 105*a* relative to the oil chamber 104. The damper rod 102 is connected to an unsprung member via a bush 106 which is attached to a lower end of the damper rod 102, and the damper main body 101 is connected to the vehicle body via a bracket 107 which is attached to an upper end of the damper main body 101. The damping force against the vertical vibrations of the unsprung member can thus be obtained. Further, a bump stop rubber 108$_1$ is provided on the lower side of the bracket 107, and a rebound stop rubber 108$_2$ is provided in that portion of the damper rod 102 which is inserted into the damper main body 101. The stopping function against the bumping motion and the rebounding motion of the damper can thus be obtained.

On an outside of the damper main body 101, there is vertically movably provided a cylindrical case 109 which is connected to the damper rod 102. A spring receiving member 110*a* is attached to an outer periphery of an intermediate portion of the case 109. A suspension spring 110 is interposed between the spring receiving member 110*a* and the bracket 107. Further, between the damper main body 101 and the case 109, there is formed a pressure chamber 111 which is filled with a pressure medium which changes its state between a liquid state and a gaseous state.

On an inner peripheral surface at the lower end of the case 109, there is provided a jacket 113 which abuts from the lower side with that connecting flange 112 for the case 109 which is attached to the lower end of the damper rod 102. The inner space surrounded by the jacket 113 is formed into a sump portion 111*a* which is in communication with the portion of the pressure chamber 111 above the flange 112 via an opening 112*a* formed through the flange 112. The space between the outer peripheral surface of the jacket 113 and the inner peripheral surface of the case 109 is formed into a heating chamber 114. On an outer surface at the lower end of the case 109, there are provided an inlet 114*a* and an outlet 114*b* which are in communication with the heating chamber 114. The heating medium which is heated by the heat of the driving source of the vehicle is thus caused to flow through the heating chamber 114.

When the heating medium is caused to flow through the heating chamber 114, the liquid phase pressure medium which stays in the liquid sump portion 111*a* is heated and evaporated. The internal pressure of the pressure chamber 111 thus increases, and the damper rod 102 lowers relative to the damper main body 101, whereby the vehicle height increases. In this case, the flow of the heating medium into the heating chamber 114 is controlled by an appropriate control mechanism to thereby maintain the vehicle height at a predetermined height.

In the above-described embodiments, the waste heat of the driving source is used as the heating source for heating the heating medium. It is also possible to use other heating sources. Further, the present invention is not limited to the hydraulic damper of the above-described embodiments, but can also be applied to other damper such as friction dampers, or the like.

As can be seen from the above-described explanations, according to the present invention, the pressure source for adjusting the vehicle height can be integrally assembled into the damper. Therefore, its attaching to the vehicle body becomes easy.

It is readily apparent that the above-described vehicular damper with a vehicle height adjusting function meets all of the objects mentioned above and also has the advantage of wide commercial utility. It should be understood that the specific form of the invention hereinabove described is intended to be representative only, as certain modifications within the scope of these teachings will be apparent to those skilled in the art.

Accordingly, reference should be made to the following claims in determining the full scope of the invention.

What is claimed is:

1. A vehicular damper with a vehicle height adjusting function, having a damper main body and a damper rod which is vertically movably inserted into said damper main body, said damper comprising:

a cylindrical case which is vertically movably provided on an outside of said damper main body and which is connected to said damper rod;

a pressure chamber which is formed between said damper main body and said case and which is filled with a pressure medium which changes its state between a gaseous state and a liquid state; and a heating chamber contained entirely within said damper main body, said heating chamber heating and evaporating the pressure medium inside said pressure chamber by causing a warm heating medium to flow through said heating chamber, wherein said vehicle height increases as a result of an increase of an internal pressure of said pressure chamber due to evaporation of the pressure medium.

2. A vehicular damper according to claim 1, further comprising a cover disposed on an outside of said case, said cover being arranged to move up and down depending on an ambient temperature.

3. A vehicular damper according to claim 2, wherein said cover is supported by a thermally deformable supporting member so as to be vertically movable.

4. A vehicular damper according to claim 2, wherein an outer peripheral surface of said case is covered by a thermally insulating material, and wherein a plurality of cooling fins are formed in that part of a vertically elongated outer peripheral surface of said case which is free from covering by said thermally insulating material such that, by the movement of said cover due to an increase in the ambient temperature, said cooling fins are exposed outside.

5. A vehicular damper according to claim 3, wherein an outer peripheral surface of said case is covered by a thermally insulating material, and wherein a plurality of cooling fins are formed in that part of a vertically elongated outer peripheral surface of said case which is free from covering by said thermally insulating material such that, by the movement of said cover due to an increase in the ambient temperature, said cooling fins are exposed outside.

6. A vehicular damper according to claim 1, wherein said damper rod is inserted into said damper main body from an upper side, and wherein said heating chamber is formed to extend in a vertical direction along a peripheral wall portion of said damper main body such that a vertical overlapping length between said pressure chamber and said heating chamber decreases as a result of an upward movement of said case relative to said damper main body.

7. A vehicular damper according to claim 6, wherein said heating chamber is divided into at least two chambers, and wherein said heating chamber is switchable between a state in which the heating medium flows only into a lower chamber and a state in which the heating medium flows also into an upper chamber.

* * * * *